United States Patent [19]
Baum et al.

[11] Patent Number: 5,154,376
[45] Date of Patent: Oct. 13, 1992

[54] CABLE-SECURING DEVICE WITH LADDER TYPE STRAP

[75] Inventors: Heinz-Otto Baum, Giessen-Allendorf; Johann Reindl, Biebertal, both of Fed. Rep. of Germany

[73] Assignee: Emhart Industries, Inc., Towson, Md.

[21] Appl. No.: 579,378

[22] Filed: Sep. 7, 1990

[30] Foreign Application Priority Data

Sep. 25, 1989 [DE] Fed. Rep. of Germany ....... 8911414

[51] Int. Cl.$^5$ ............................................. F16L 3/08
[52] U.S. Cl. ..................... 248/74.3; 248/73; 24/16 PB
[58] Field of Search ............ 248/74.3, 62, 73, 74.1, 248/507, 508, 68, 71; 24/16 PB, 17 AP

[56] References Cited

U.S. PATENT DOCUMENTS

| | | | |
|---|---|---|---|
| 3,054,585 | 9/1962 | Roberts | 24/16 PB |
| 3,983,603 | 10/1976 | Joyce | 24/16 PB |
| 4,261,539 | 4/1981 | Albern | 248/74.3 |
| 4,389,754 | 6/1983 | Sohma | 24/16 PB |
| 4,447,934 | 5/1984 | Anscher | 24/16 PB |
| 4,728,064 | 3/1988 | Caveney | 248/74.3 |
| 4,788,752 | 12/1988 | Kraus | 24/16 PB |
| 4,860,979 | 8/1989 | Camenisch | 248/74.3 |

Primary Examiner—Ramon O. Ramirez
Assistant Examiner—Robert A. Olson
Attorney, Agent, or Firm—Spencer T. Smith

[57] ABSTRACT

A cable-securing device having a locking head and a flexible strap extending therefrom in the form of a ladder having cross bars extending between parallel side members. The cross bars are larger than the separation of the side members so that they are bent as they lie in the plane of the side members. The device has a projecting locking peg which forms a cable-securing loop when a cross bar is engaged by the locking peg.

3 Claims, 1 Drawing Sheet

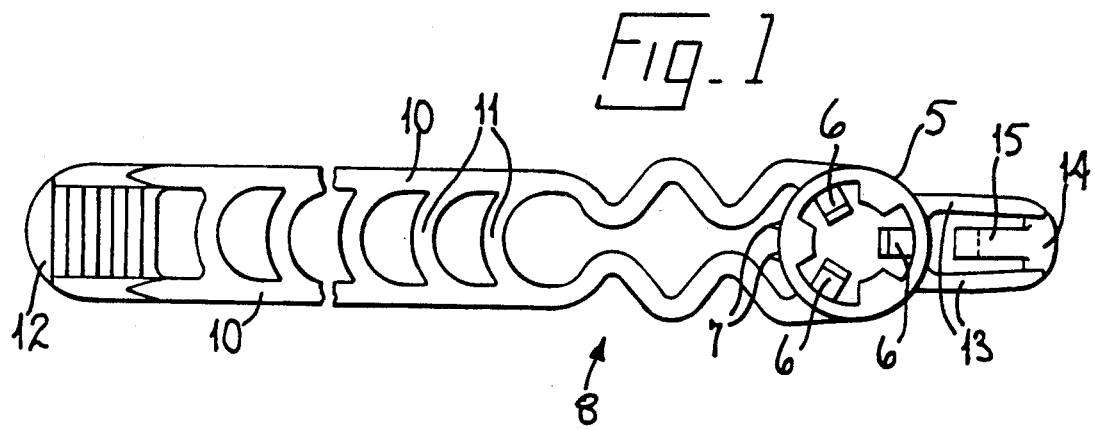
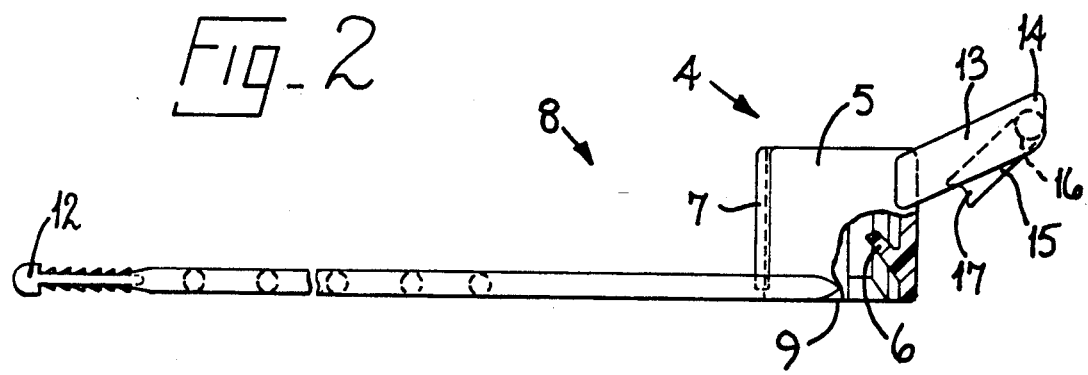
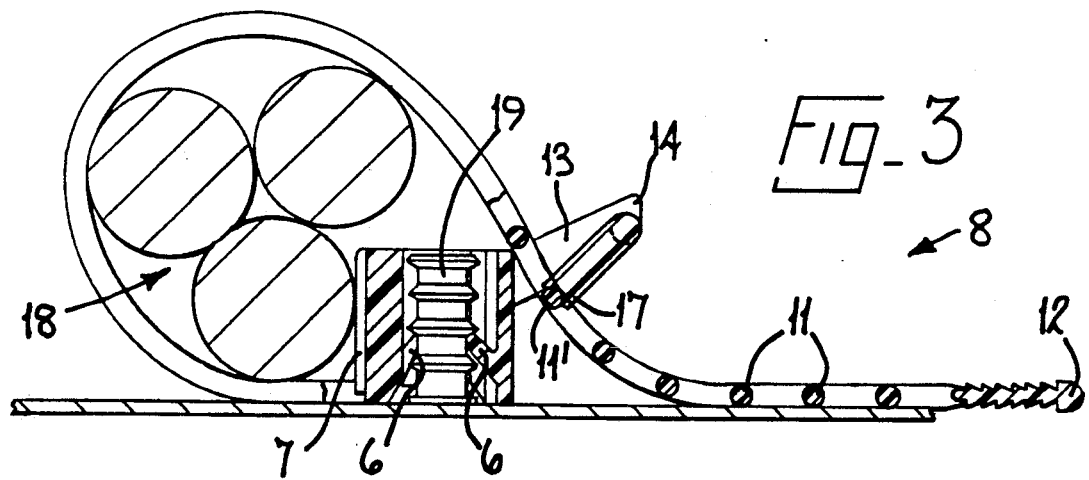
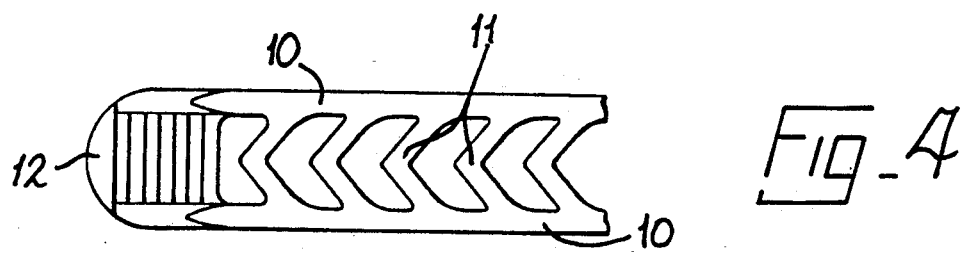

CABLE-SECURING DEVICE WITH LADDER TYPE STRAP

BACKGROUND OF THE INVENTION

The present invention relates to a cable-securing device of the kind comprising a locking head having a flexible strap extending therefrom and with which in use cables and the like are secured in a loop formed by securing the free end of the strap in the locking head. The locking head is usually provided with mounting means, being for example adapted to clip on to a mounting projection such as the head of a stud. Such cable-securing devices are commonly made of a plastics material.

A variety of arrangements have been proposed and used to secure the free end of the strap in the locking head. In some cases, transverse ridges or grooves are formed in the strap so as to facilitate locking of the free end of the strap in the locking head. U.S. Pat. No. 4,447,934 discloses the use in a cable-securing device of ratchet flaps formed in the flexible strap and adapted to engage with a ratchet lock in the locking head.

German specification DE 34 47 693 discloses a cable-securing device in which the strap is formed with full-width teeth which similarly engage a ratchet arrangement in the locking head.

European patent EP 0 125 158 discloses a cable-securing device having a plurality of transverse slots formed in the flexible strap which are adapted to engage a catch in the locking head.

Such slots may be enlarged and German gebrauchsmuster G 85 22 688 discloses a strap fastener in which a series of holes in the strap are adapted to engage a peg in the locking head. A form of fastener has thus evolved having a strap with a ladder-like structure having holes defined by transverse 'rungs' or cross-bars joining parallel side members at right angles. Such a strap fastener is disclosed in U.S. Pat. No. 3,983,603.

BRIEF DESCRIPTION OF THE INVENTION

According to the present invention, a cable securing device having a locking head and a flexible strap extending therefrom in the form of a ladder is characterised in that the cross bars connecting the side members of the ladder structure are longer than the separation of the side members so that they are best as they lie in the plane of the side members.

The cross bars may be curved as in the arc of a circle or may be bent in a V-configuration. Preferably they are bent or curved towards the free end of the strap.

Preferably the locking head is provided with a locking peg projecting from the locking head away from the strap, said peg including a resilient finger which projects from the peg to provide a locking notch but which may easily be depressed to lie substantially flush within the peg.

Preferably, the locking peg projects from the locking head at an angle of 25° to 75° from the original axis of the strap.

BRIEF DESCRIPTION OF THE DRAWINGS

In order that the present invention be better understood, a preferred embodiment will now be described in greater detail with reference to the accompanying drawing in which:

FIG. 1 is a partial plan view on an enlarged scale of a cable fastener according to the prevent invention, FIG. 2 is a part-section side view of the fastener of FIG. 1, FIG. 3 is a partial plan view of an alternative construction to FIG. 1 of a cable fastener, and FIG. 4 is a part section of a cable bundle retained by the fastener of FIGS. 1 and 2.

DETAILED DESCRIPTION OF DRAWINGS AND PREFERRED EMBODIMENT

The locking head comprises a short, tubular body 5, said body being provided with internal projections 6 and a pair of longitudinal cable-locating ridges 7. Resilient strap 8 extends normally from base 9 of the tubular body. Strap 8 is formed by narrow twin parallel side members 10, the side members 10 being linked by a series of cross bars 11 which are curved away from the body 5 and thus towards the free end 12 of the strap. The cross bars 11 have the form of circular arcs, but FIG. 4 illustrates an alternative construction where cross bars 11 have a V-configuration.

A peg 13 projects upwards and away from the side of body 5 remote from strap 8 at an angle of 25° from the longitudinal axis of the strap (i.e. at an angle of 65° from the axis of the tubular body 5). This angle can, of course, be varied as desired but preferably is from 25° to 75° from the axis of the strap. Nose end 14 of peg 13 is rounded in profile.

A resilient finger 15 is located in body 5, outer end 16 of finger 15 being within nose end 14 of peg 13 and the free end 17 of finger 15 projecting from body 5 to form a catch. Finger 15 will lie within peg 13 if pressure is applied to free end 17 of finger 15 to depress it within peg 13.

In operation, the fastener of the invention is secured by pressing tubular body 5 over a stud 19 where it is retained by projections 6. A loop is formed round a bundle 18 of cables by pressing peg 13 between side members 10 of the free end of strap 8 so that finger 15 engages a cross bar 11' of the strap 8. The rounding of nose end 14 greatly facilitates the manipulation of peg 13 in relation to strap 8. As nose end 14 of peg 13 passes between two adjacent cross bars 11, 11', finger 14 is depressed within peg 13 but when the passage of peg 13 allows the free end 17 of finger 16 to project from peg 13, it acts as a catch to engage a cross bar 11'. The length of loop in the strap 8 needed to enclose the bundle 18 of cables determines the cross bar 11' which is to engage peg 13 and finger 15 and the cables are aligned within the loop of strap 8 by contact with cable-locating ridges 7. The strap 8 with curved cross bars 11 are self-adjusting when the looped (loaded) strap is under tension and it is thus both simpler to use and more efficient.

The bundle 18 of cables may readily be released, if desired, simply by depressing free end 17 of finger 15 to allow cross bar 11' to be released from peg 13.

We claim:

1. A bundling band comprising
   tubular body means for receiving a fastener for securing said tubular body in position,
   an elongated strap connected to said tubular body and extending in a first direction including side strips interconnected by selectively spaced cross bars,
   a peg secured to said tubular body and extending at an incline in a second opposite direction for preventing the displacement of a cross bar located thereagainst, said peg being selectively configured so that it can be inserted into an opening in said strap defined by said side strips and adjacent cross bars, and means for preventing the removal of said strap from said peg including latch means secured to the free end of said peg and resiliently pivotally displaceable from a first position in line with a cross bar where the end of said latch engages the cross bar and prevents its removal from said peg and a second position overlapping said peg and permitting removal of said strap from said peg.

2. A bundling band according to claim 1, wherein said cross bars are cylindrical and said resiliently displaceable latch means has a curved free end for engaging a cross bar.

3. A bundling band according to claim 2, wherein said peg is inclined from the horizontal by about 25°.

* * * * *